May 14, 1968  C. A. J. VAN DE MADEN ET AL  3,382,540
PRESS FOR MANUFACTURING ARTICLES FROM POWDER MATERIAL
Filed March 30, 1966  4 Sheets-Sheet 4

INVENTORS
C. A. J. VAN DE MADEN
J. K. VAN DER STEEN
BY
AGENT

3,382,540
PRESS FOR MANUFACTURING ARTICLES FROM POWDER MATERIAL

Cornelis Adrianus Johannes van de Maden and Johannes Karel van der Steen, Emmasingel, Eindhoven, Netherlands, assignors to North American Philips Company, Inc., New York, N.Y., a corporation of Delaware
Filed Mar. 30, 1966, Ser. No. 538,634
Claims priority, application Netherlands, Nov. 30, 1965, 65—15,517
5 Claims. (Cl. 18—16.5)

The invention relates to a press for manufacturing articles from powder material and in particular to a press for making ferrite memory cores of small size (for example 20 mil–10 mil).

In presses heretofore utilized for manufacturing memory cores of small size, a charge of ferrite powder was squeezed between two movable opposed dies which were brought into alignment for the pressing operation and separated for ejecting the pressed article. In the known presses, a very high order of accuracy is required for alignment of the opposed dies and when adjustment is required the "down time" of the press is considerable. Further, the greatest wear in a mold is at the forming area which is centrally located in the known presses, so that the articles become slightly enlarged. These enlarged articles cannot be ejected from such mold without breakage.

Another disadvantage of the known presses relates to adjustment of the press in order to obtain the desired density of the pressed article.

Briefly described, the press according to this invention, overcomes the above enumerated disadvantages of presently known presses by providing a single movable die and a lever system for very accurately adjusting this movable die for density control.

The primary object of this invention is to provide a press for manufacturing very small memory cores and the like which does not have the above-noted disadvantages and is simple and reliable in operation.

Another object is to provide a press which has a larger capacity and smaller reject rate than known presses.

The foregoing objects will become apparent to those skilled in the art from the following detailed description of a presently preferred embodiment of a press illustrated in the accompanying drawing.

Figure 4:
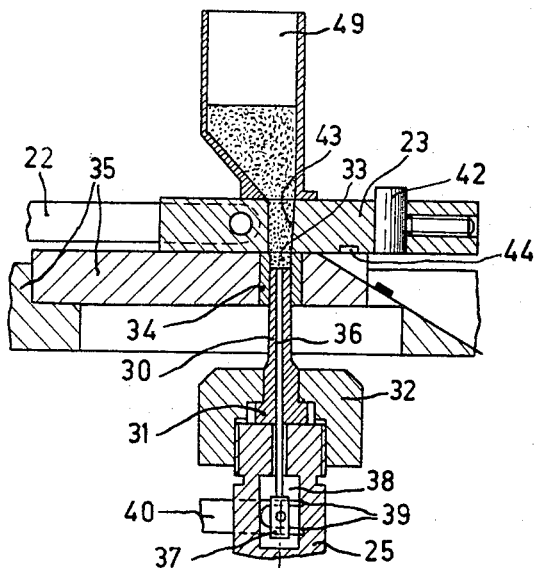
Figure 5:
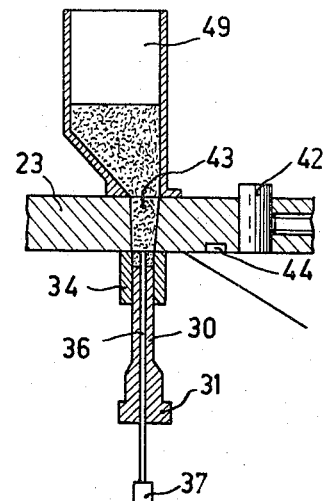
Figure 6:
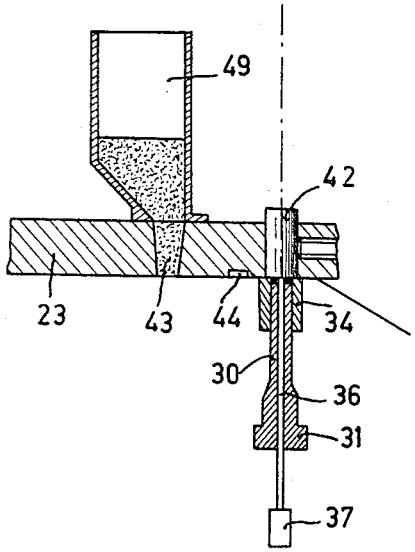

FIG. 4, on a larger scale, the mutual positions of the slide, the lower die and the pin during the filling of the mold;

FIG. 5 shows the mutual positions upon raising the pin;

FIG. 6 shows these mutual positions during molding, and

Figure 7:
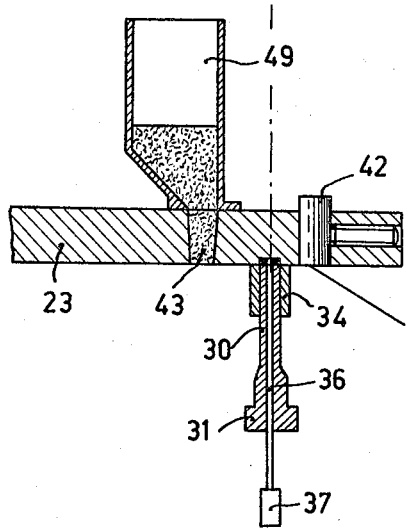

FIG. 7 shows the expelling of the annular article.

Figure 1:
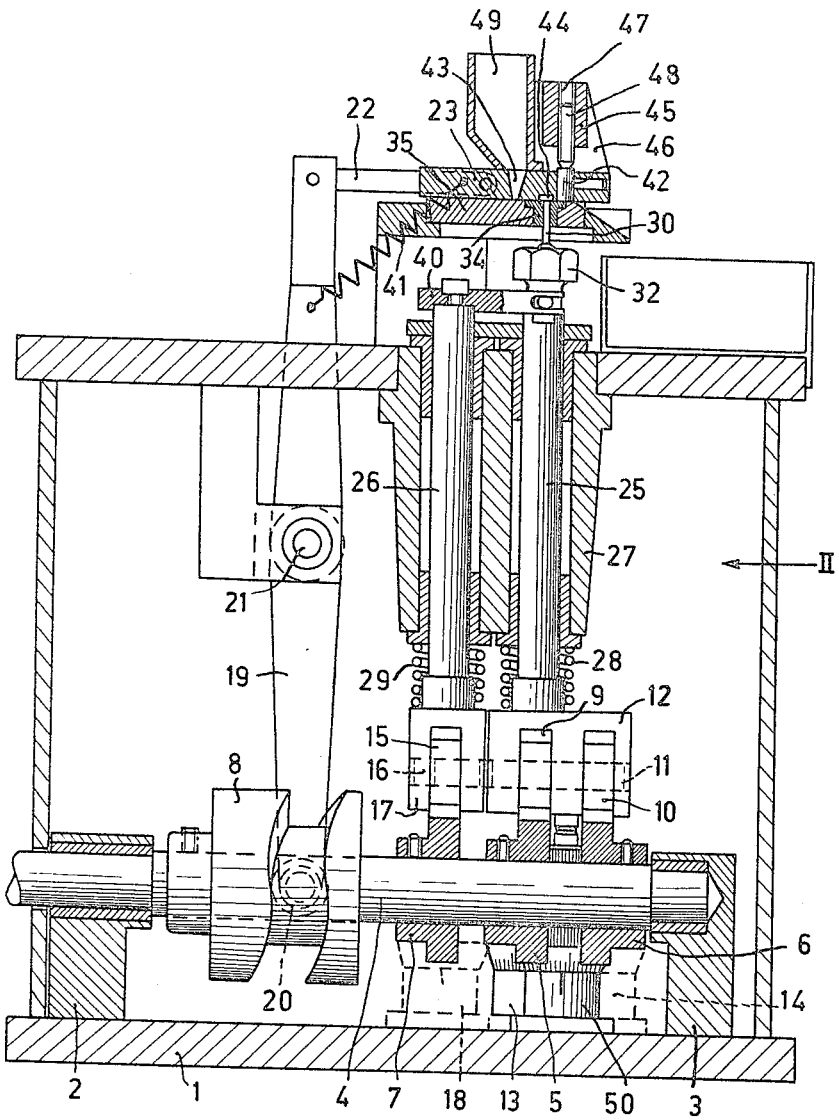
FIG. 1 is a sectional view of a press for manufacturing cores for store elements, taken on the line I—I of FIGURE 2.
Figure 2:
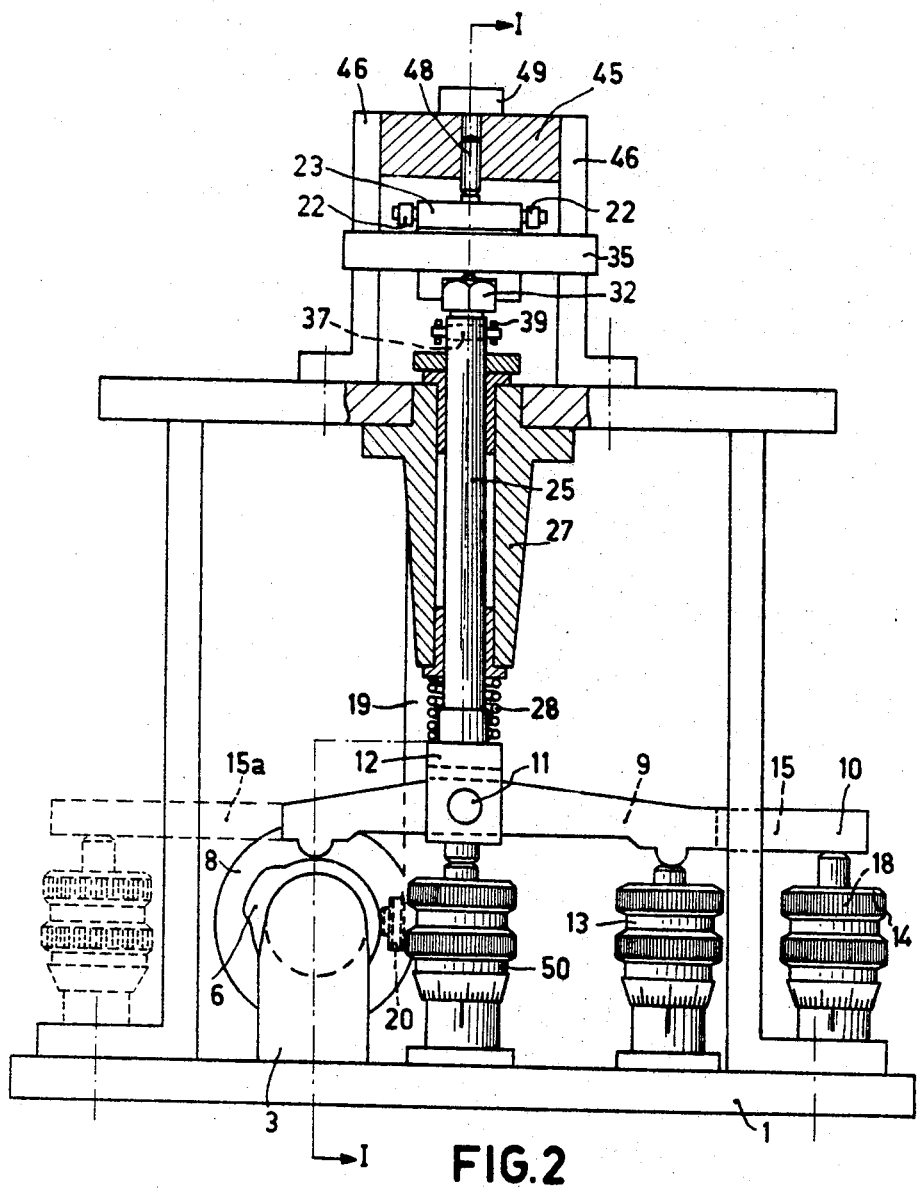
FIG. 2 is an elevational view, partly in section, of the presses viewed in the direction of the arrow II of FIG. 1.

Referring to FIGS. 1 and 2, the press for manufacturing cores for memory planes of computers comprises a frame plate 1 having supports 2 and 3 in which a shaft 4 is journalled. The shaft 4 is driven by a motor (not shown). The shaft 4 carries three cams 5, 6 and 7 and also a grooved disc 8. The cams 5 and 6 co-act with one end of levers 9 and 10 respectively, which levers are pivotal about a pin 11 supported in a bifurcated support 12. The other ends of the levers 9 and 10 respectively bear on adjustable microscrews 13 and 14 respectively. The cam 7 co-acts with one end of a lever 15 which is pivotable about a pin 16 included in a support 17. The other end of the lever 15 bears on an adjustable microscrew 18. The grooved disc 8 co-acts with a roller 20 secured at one end of lever 19. The lever 19 is pivotable about a pin 21 and connected at its other end to a rod 22 pivotally coupled to a slide 23.

The supports 12 and 17 are connected to rods 25 and 26 respectively, which rods are slidable axially in a guide 27. The rods 25 and 26 are subjected to a force in the downward direction by means of springs 28 and 29 arranged between the fixed guide 27 and the supports 12 and 17.

A hollow cylindrical lower die 30 (see FIGS. 4–7 also) is secured to the upper end of the rod 25. The lower die 30 is elongated in shape and has a thickened part 31 which is threaded (not shown). The part 31 is connected by means of a nut 32 to the rod 25. For this purpose, rod 25 is threaded at its upper end. The upper end of the lower die 30 extends into the cavity 33 of a mold 34 which is embedded in a fixed mold support 35 of the frame. A core pin 36 (FIGS. 4–5) is guided in the bore of lower die 30 and has, at its lower end, a transverse thickened portion 37 which is elongated transversely of core pin 36. This elongated portion 37 is located within an aperture 38 in the rod 25 (FIGS. 2 and 4) and project outwardly at each side of the rod 25. The outward ends of portion 37 are located between teeth 39 of a coupling yoke 40, one end of which is connected to the rod 26.

A slide 23 is provided which moves to and fro over the frame part or mold support 35. A spring 41 (FIG. 1) may be arranged between the arm 22 and the lever 19 which pulls the slide against the fixed support 35. The slide 23 has, as integral elements, an upper die or anvil 42, a funnel-shaped aperture 43 for receiving powdered material from a container 49, and a recess 41 for receiving articles expelled from the mold 34. A bridge piece 45, having supports 46 which are secured to the frame part 35 is located above the slide. The bridge piece 45 has a threaded bore 47 containing a screw bolt 48 which co-acts with the upper surface of the anvil 42.

The device described above operates as follows:

Assume that the shaft 4, the cams 5, 6 and 7, and the grooved disc 8 are rotating and that at a given moment, the cams occupy positions such that the slide 23, the lower die 30 and the pin 36 occupy the positions shown in FIG. 4. The lower die 30 and the pin 36 thus are in their lowest positions and the mold cavity 33 is filled with powdered material through the aperture 43 in the slide. Subsequently, the cam 7 raises the rod 26 so that the pin 36 moves upwards via the coupling element 40 until its upper side is very accurately level with the upper side of the mold (FIG. 5). Excess powder has thus been removed from the cavity of the mold. By making the pin 36 movable, it is possible to fill the mold in the withdrawn position of the pin. This is more favorable than filling into an annular chamber which would be required if the pin 36 were fixed with respect to the mold. The slide 23, controlled by the grooved disc 8, now moves to the left and assumes the position shown in FIG. 6, in which the anvil die 42 covers the cavity of the mold, whereupon the cam 5 moves the lower die 30 in an upward direction. During this operation the pin 36 remains in its upper position (FIG. 5). When the powdered material has been pressed to the proper density, the slide 23 now moves to the right whereby the recess 44 in the slide comes to rest momentarily above the matrix cavity of the mold. The lower die 30 is now moved further in the upward direction until its upper side is exactly level with the upper side of the mold whereby the pressed article is pushed into the recess 44 (FIG. 7). The slide 23 subsequently shifts further to the right so that the article drops out of the recess 44 and the position of FIG. 4 is reached again and the cycle is repeated.

The movements of the lower die 30, the pin 36 and the slide 23 are derived from the cams 5, 6 and 7, and the grooved disc 8, all of which are fixed on the same shaft 4 so that the relative movements of said parts are completely synchronized. The shape of the lifts of each of the cams 5, 6 and 7 determines the extent of movement of the lower die 30 and of the pin 36.

Figure 3:
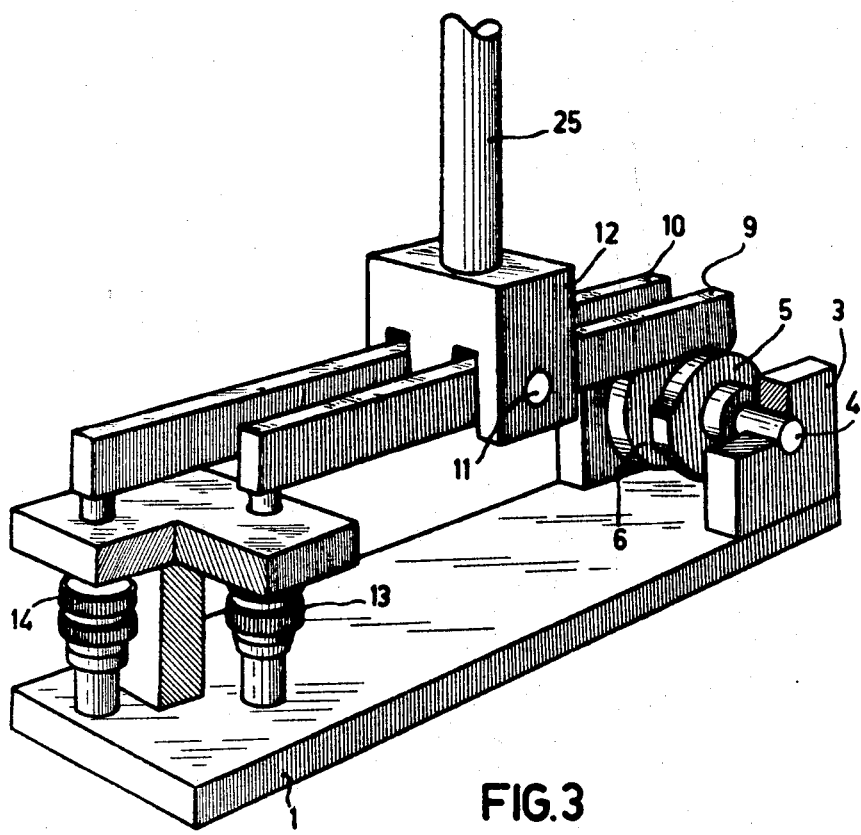
FIG. 3 is a perspective view of two levers acting on the lower die, which are included in one support.

The lower die 30 is moved by both of the two levers 9 and 10. However, since the lobes of cams 5 and 6 have different elevations and are offset, only one of these levers is simultaneously in contact with its associated cam (FIG. 3). For example, lever 9 lifts rod 25 for pressing the powder in the mold whereas lever 10 elevates the rod 25 further for ejecting the article into the recess 44. Thus, when lever 9 engages its lobe on cam 5, lever 10 is clear of the trailing lobe on cam 6. While lever 9 is lifted, lever 10 now engages the lobe on cam 6 and further elevates rod 25. The ultimate highest molding position of the lower die 30 depends not only upon cam 5 but also upon the adjustment of the stop 13 which has the form of a microscrew. The highest position of the lower die 30 for pressing may be adjusted to any desired value with very high accuracy by means of microscrew 13 without involving further manipulation of the apparatus. This accuracy is increased further by the ratio of the long and short arms of the lever 9. The expelling height of the lower die 30 is adjustable by means of microscrew 14 which may be adjusted so that the lower die in its highest position is accurately level with the upper side of the mold.

The lowest position of the lower die 30 at which the mold is filled with powdered material may be determined very accurately by means of an adjustable stop in the form of a microscrew 50 (FIG. 2) arranged below the support 12. In the filling position of the mold the two levers 9 and 10 are clear of their associated cams. It is also possible to regulate the lowest position of the lower die 30 by means of a third lever (not shown) pivotable about the pin 11 which co-acts with an associated cam and an adjustable stop arranged similar to the elements cooperating with levers 9 and 10 for pressing and ejecting operations.

The movement of pin 36 is similar to that of the lower die 30. Since the pin 36 must be adjusted with utmost accuracy only in its highest position, operation by only one lever 15 is needed. The highest position of pin 36 may now be adjusted in a simple manner by means of microscrew 18 (FIG. 1).

The press described is highly suitable for manufacturing very small cores for memory planes, but it may also be used for manufacturing, for example, thin plates of ceramic material, such as used in electric capacitors. The mold may or may not be provided with a pin 36 dependent upon whether an aperture must be present in the pressed article. Furthermore, it is possible to replace parts of the above-described apparatus by other parts which have similar actions. Thus, for example, the adjustable stops need not be microscrews and the lower die and the pin may be secured to the rods 25 and 26 in a different way.

To obtain satisfactory filling of the cavity of the mold it may be useful, especially in the manufacture of very small articles, if the mutual movements of the lower die 30 and the pin 36 are slightly different from those described with reference to FIGS. 4 and 5. The mold filling position of the lower die 30 is then controlled by means of a third lever (not shown), pivotable about the pin 11 of support 12 which lever co-acts at one end with a cam and bears at its other end on an adjustable stop, the same as levers 9 and 10. In the manufacture of, for example, very small cores for memory planes, the mold contains only a small number of powder grains after it is filled. If the pin 36 moves upwards when the filling aperture 43 is still above the mold cavity 33, there is a risk that the pin 36 may push back an excessive amount of powder grains into the funnel 43 and that the ring to be pressed will not obtain sufficient density. To prevent this the grooved disc 8 may be such that, after the mold has been filled, the slide is shifted slightly so that the funnel-shaped aperture 43 does not register with the mold cavity. The cam of this third level subsequently causes the lower die 30, and hence the powdered material in the cavity to sink slightly. Then the cam 7 acts upon the lever 15 so that the pin 36 moves in the upward direction until its upper end is level with the upper side of the mold. The further movements of the slide 23, the lower die 30 and the pin 36, may again be identical with those previously described.

It may also be useful for filling a very small cavity in which a third lever pivotable about the pin 11 is used to form the associated cam so that the lower die 30 first moves lower in the mold so that an excessive filling of the cavity is obtained. Subsequently, with slide 23 positioned so that the filling aperture 43 is still above the cavity of the mold, the lower die 30 is moved back to the height desired for correct filling. Further movements of the slide 23, the lower die 30 and the pin 36 may again be identical with those previously described. This latter method is particularly advantageous for placing powdered material in the corners of an angular mold cavity.

The core pin may be made stationary by extending lever 15 as shown at 15a so that it contacts a microscrew as shown in phantom in FIG. 2.

What is claimed to be new and novel and secured by Letters Patent of the United States is:

1. A press for manufacturing articles from powder material comprising a rigid base structure, having a fixed mold support member, a mold having a configured cavity in said mold support member, a slide member overlying said mold support member, means for moving said slide member relative to said mold, an anvil in said slide for closing one end of said mold cavity during pressing of a powder material in said mold cavity, a movable die means having a portion within said mold cavity, said movable die means entering said mold cavity from the end of said mold cavity opposite said anvil, a first means connected with said movable die means for moving said die means for pressing powder in said mold cavity against said anvil, adjustable means connected with said movable die means for positioning said die means in said mold cavity relative to said anvil, and second means connected with said movable die means for moving said die means for ejecting an article from said mold cavity upon movement of said slide for removal of said anvil from said mold cavity closing position thereof, and both said means for moving said slide and said movable die means being driven by a common shaft in timed relation.

2. A press according to claim 1 wherein said first and second means for moving said movable die means comprises a first lever system connected with said movable die means, rotatable cam means connected with said first lever system for moving said lever system whereby said movable die means is moved within the cavity of said mold, said adjustable means being connected with said lever means for positioning said movable die means within said cavity relative to said anvil.

3. A press according to claim 2 wherein said first lever system includes a pair of first class levers, a bifurcated member connected with said movable die means, said pair of first class levers being pivotally connected with said bifurcated member between the ends of said levers; said cam means being operatively connected with both said pair of levers at the corresponding ends thereof and said adjusting means being connected at the opposite corresponding ends of both said pair of levers; said cam means successively moving said pair of levers for moving said die means for pressing powder material in said mold cavity and ejecting the article thus formed from said mold cavity.

4. A press according to claim 1 wherein said slide comprises a movable plate having a first aperture for receiving said anvil, a second aperture for admitting powder material to said mold when said second aperture and said mold are axially aligned by movement of said plate, and a third aperture for receiving an article ejected from said mold when said third aperture and said mold are axially aligned by movement of said plate.

5. A press according to claim 2 wherein said movable die means comprises a hollow lower die member, a core pin member slideable concentrically within said lower die member and having a greater length dimension than said lower die member; means for connecting a second lever system, with said core pin member and said second lever system, a second rotatable cam means connected with said second lever system for moving said core pin means relative to said lower die member, and a second adjustable means connected with said second lever system for positioning said core pin means relative to said anvil, said second cam means being driven by said common shaft in timed relation with both said movable die member and said slide means.

References Cited

UNITED STATES PATENTS

| | | |
|---|---|---|
| 2,448,277 | 8/1948 | Renier. |
| 3,020,589 | 2/1962 | Maritano _____ 18—16.5 |
| 3,132,379 | 5/1964 | Crane _____ 18—16.5 |
| 3,149,375 | 9/1964 | Gehl _____ 18—16.5 |

J. HOWARD FLINT, JR., *Primary Examiner.*